Sept. 27, 1960 J. L. RENNICK 2,954,494

CATHODE-RAY BEAM CORRECTION STRUCTURE

Filed April 25, 1958

INVENTOR
John L. Rennick
BY Francis W. Crotty
ATTORNEY

United States Patent Office 2,954,494 Patented Sept. 27, 1960

2,954,494

CATHODE-RAY BEAM CORRECTION STRUCTURE

John L. Rennick, Elmwood Park, Ill., assignor to Zenith Radio Corporation, a corporation of Delaware Filed Apr. 25, 1958, Ser. No. 730,988

4 Claims. (Cl. 313—76)

This invention is directed to means for influencing the deflection of the electron beam in a cathode-ray tube, and more particularly to permanent magnet means for adding a direct component to the alternating flux components provided by the yoke deflection coils.

The use of a deflection yoke assembly to produce deflection fields and thus direct an electron beam to impinge upon a preselected landing area of the viewing screen is now well known and understood in the art. The use of a beam-centering field, established by one or more permanent magnets disposed adjacent the tube neck, to effect centering of the display or picture on the viewing surface is also known. It is desirable that the direct flux component provided by the permanent magnet be added to the alternating flux produced by the sweep coils at the magnetic deflection center of the yoke assembly. This deflection center is not a single point for all conditions of beam deflection, but for this explanation, the center of deflection can be considered a point on the tube axis, or, when the yoke assembly is removed from the tube, a point near the center of the assembly and centrally located in the cylindrical bore which receives the neck section of the tube.

In effecting beam corrections for the cathode-ray tubes of monochrome (black-and-white) television receivers, positioning of the correction magnet exactly at the deflection center is not an inflexible requirement. Some black-and-white correction arrangements use a magnet supported at the rear of the yoke assembly. Clearly this arrangement introduces a measurable deflection error which in turn causes an error in the beam landing area, but this error is not of major importance in the black-and-white picture. The contrary is true in color television sets; because the point of beam incidence controls the hue of the color display, such an error destroys color purity in the reproduced image. For this reason it is essential that the beam correction magnet or magnets be positioned as closely as possible to the deflection center of the yoke assembly for a color cathode-ray tube.

A mechanical assembly has been used in television receivers to support the yoke at its external central portion; such a support does not impede a predetermined amount of longitudinal motion of the yoke along the tube neck required to correctly position the yoke assembly. Such construction has permitted the use of a correction magnet mounting arrangement in which two annular permanent magnets are disposed adjacent each other in the space between the tube neck and the yoke at the magnetic deflection center. The two magnets can be separately attached to concentric sleeves extending beyond the rear of the yoke and thus permit independent adjustment of each magnet. Such an arrangement is disclosed and claimed in the copending application of Sol L. Reiches, Serial No. 490,296, filed February 24, 1955, for a "Magnet Centering Device for Multiple Ray Beam Cathode Ray Tubes," and assigned to the assignee of this invention.

Recent structural modifications of yoke assemblies have been directed to the removal of the external yoke supporting arrangement. One modification includes a liner or cushion element positioned between the yoke and the tube neck, so that the liner maintains the yoke assembly in concentric alignment with the tube axis. After the yoke assembly is adjusted in the correct longitudinal position on the tube neck, the yoke is secured in position by an adjustable clamp at the rear of the assembly for compressing the rear portion of the liner and clamping this portion to the tube neck. This position-locking arrangement, however, precludes insertion of concentric sleeve elements to effect adjustment of the correction magnets, as described and claimed in the above-identified copending application.

It is an object of this invention to provide adjustment means for the correction magnets which are reliable and simple in operation.

It is a further object of the invention to provide such adjustment means which are operable although the rear portion of the yoke assembly is securely fastened to the tube neck.

It is another object of the invention to provide adjustment means which are substantially more economical than prior art devices.

In accordance with the invention, a deflection yoke and beam-centering structure for a cathode-ray tube comprises a yoke assembly which includes a plurality of deflection windings having a magnetic deflection center and a cylindrical bore for receiving the neck portion of a cathode-ray tube. A pair of permanent magnets, at least one of which has an annular channel-way in a peripheral surface thereof, are supported by the assembly in the region of the deflection center and in nested concentric relation with respect to the bore. These magnets are supported for movement along a path concentric with the bore, conjointly to establish a beam-centering field transversely of the bore. At least one flexible cord, disposed in the aforesaid channel-way in frictional engagement therewith and threaded through the yoke assembly to be accessible externally thereof and movable relative thereto, is provided for effecting relative displacement of the magnets along the concentric path to adjust the angular orientation of the magnets and thus regulate the direction and the strength of the beam-centering field.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figures 1, 2, 3, 4:
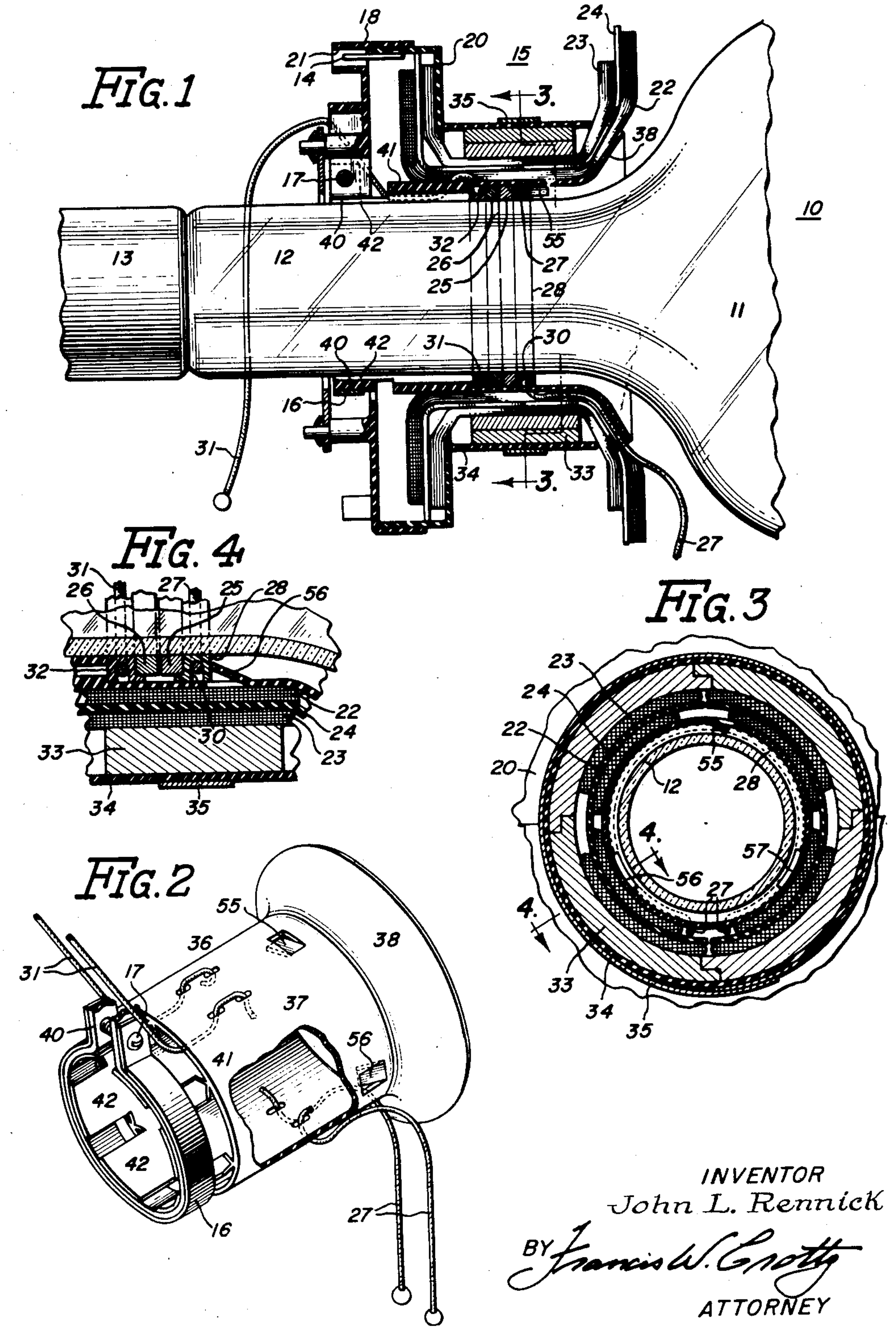
Figure 1 is a side view, partly in section, of a portion of a cathode-ray tube and a deflection yoke structure including a preferred embodiment of the invention.
Figure 2 is a perspective illustration of certain of the elements shown in Figure 1.
Figure 3 is a sectional view, taken along the lines 3—3, of a portion of the structure shown in Figure 1.
Figure 4 is a sectional illustration, taken along the lines 4—4, of a portion of the structure depicted in Figure 3.

The cathode-ray tube 10, a portion of which is shown in Figure 1, has a flared front portion 11 and a cylindrical rear or neck portion 12. A conventional base 13, affixed to the neck portion 12 in a manner well known and understood in the art, supports a plurality of connector pins (not shown) for providing electrical connection between the elements (not shown) within tube 10 and external circuit elements (not shown). The yoke and beam-centering assembly 15 is positioned on neck portion 12 and secured longitudinally in position by means including a clamp 16 and an adjusting screw 17. A rear cover plate 18 is constructed for mating engagement with the flange member 20 at the rear of assembly 15. Such engagement is accomplished by detents (not shown) which are positioned in corresponding apertures (not shown) of flange member 20 as rear cover plate 18 is positioned thereon. Cover plate 18 also includes a plurality of hollow rectangular extensions 21 through which conductors may be passed and fastened to the connector terminals 14 of the sweep coils.

The horizontal sweep windings 22 and the vertical deflection windings 23 are positioned on either side of an insulating element 24 of assembly 15. In the central portion of assembly 15 are disposed a pair of annular correction magnets 25 and 26, illustrated in dashed outline, which may be constructed of ferrite or a similar material. Magnets 25 and 26 are supported by assembly 15 at the deflection center of the yoke arrangement and positioned in nested concentric relation. That is, the two magnets, each of substantially the same shape and dimensions, are positioned adjacent each other so that the center of each magnet falls on the axis of the cylindrical bore of yoke and beam-centering assembly 15.

In accordance with the invention, a first flexible control cord 27 is positioned in mechanical engagement with magnet 25 and extends externally of assembly 15. As shown both in Figure 1 and the sectional illustration of Figure 4, a non-magnetic drive wheel 28, which may be formed from one of the common non-magnetic plastic materials, is secured to the magnetic element 25 by adhesive or other suitable means. A channel or annular groove 30 is provided in the non-magnetic wheel 28 to receive the flexible control cord 27 in mechanical engagement therewith. Alternatively, such a channel can be provided directly in the magnetic element 25, in which construction the non-magnetic drive wheel is not required.

A second flexible control cord 31 engages the non-magnetic drive wheel 32, affixed to the magnetic element 26, in a similar manner and also extends externally of assembly 15. The conventional core member 33, maintained in position by a cardboard or other encircling means 34, is secured by tape or other suitable binder means 35.

The innermost element of assembly 15 is a support sleeve or liner 36, constructed of plastic or other substantially rigid but somewhat deformable material, and shown in Figure 2. The liner or support sleeve includes a cylindrical central portion 37 and a front funnel-shaped portion 38. At the rear of liner 36 is a web-like section 41. The rear portion of liner 36 includes a plurality of tabs 42 which extend into the space between the tube neck 12 and a circular extension 40 at the center of the rear cover plate 18.

The magnet members, each comprising both a magnetic element and a non-magnetic element, are maintained in position by the retainer elements 55, 56, and 57, shown in Figure 3. After the magnet members are positioned within the cylindrical bore area of assembly 15, the retainers 55–57 are snapped from a flush to a protruding position, as shown in Figures 2, 3 and 4, to retain the magnet members in their proper position.

In operation, after the cathode-ray tube 10 is positioned in a television receiver, the yoke and beam-centering assembly 15 is positioned over the base 13 at the rear of the tube, and then moved forward (i.e., toward the right in Figure 1) to the desired position on the tube neck 12. This position is determined empirically by one skilled in the art using accepted test equipment and procedures. After assembly 15 is correctly positioned, adjusting screw 17 is rotated to reduce the circumference of clamp 16 and securely position assembly 15 on neck portion 12.

When assembly 15 is correctly positioned, it is necessary to adjust the positions of magnets 25 and 26 relative to each other to center the displayed image on the viewing surface of cathode-ray tube 10. In accordance with the invention, the flexible cord members 27 and 31 are individually manipulated to effect movement of the magnet members along a path concentric to the bore of assembly 15. More specifically, a pull on one end of cord 27 effects rotation of magnet 25 in a given direction, whereas a pull on the opposite end of cord 27 effects an opposite rotation of magnet 25. Because the magnet members are adjacent one another, there is sometimes a tendency for one magnet to drive the other by frictional engagement. Such movement is precluded by grasping both ends of a given flexible cord to maintain one magnet in position while the other magnet is rotated by the pull upon one end of the other flexible cord. Because each of the magnets is movable with respect to the other, both the direction and the strength of the beam-centering field are adjusted by varying the angular orientation of the magnets. Thus the magnets together establish a beam-centering field transverse to the bore of assembly 15.

The cord control means 27 and 31 are illustrated as extending from the front and rear portions, respectively, of assembly 15. It is apparent that both cords can be extended out the front, or both can be withdrawn from the rear section of the assembly. Alternatively a construction may be devised in which the flexible cords emerge through the central portion of the yoke assembly adjacent the core piece 33.

The flexible cord means are both reliable and simple in operation and are readily positioned in mechanical engagement with the magnet member. It is evident that the channels for receiving the control cords can be provided directly in the magnetic elements 25 and 26 rather than the non-magnetic or plastic portions 28 and 32. However, the illustrated embodiment has proved facile of fabrication and additionally affords substantial economies over prior art structures using rigid mechanical elements to effect magnet orientation. The flexible cord means are readily extended to points external of the assembly 15, even though the tightening of clamp 16 to secure the assembly 15 in position prevents the use of prior art arrangements which require rigid mechanical adjusting elements extending from within assembly 15 along tube neck 12, to provide adjustment means at a point to the rear of yoke assembly 15.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A deflection yoke and beam-centering structure for a cathode-ray tube comprising: a yoke assembly, comprising a plurality of deflection windings having a magnetic deflection center, including a cylindrical bore for receiving the neck portion of a cathode-ray tube; a pair of permanent magnets, at least one of which has an annular channel-way in a peripheral surface thereof, supported by said assembly in the region of said deflection center and in nested concentric relation with respect to said bore for movement along a path concentric to said bore conjointly to establish a beam-centering field transversely of said bore; and at least one flexible cord disposed in said channel-way in frictional engagement therewith and threaded through said yoke assembly to be accessible externally thereof, and movable relative thereto for effecting relative displacement of said magnets along said path to adjust the angular orientation of said magnets and thereby regulate both the direction and the strength of said beam-centering field.

2. A deflection yoke and beam-centering structure for a cathode-ray tube comprising: a yoke assembly, comprising a plurality of deflection windings having a magnetic deflection center, including a cylindrical bore for receiving the neck portion of a cathode-ray tube; a pair of permanent magnets, at least one of which has an annular channel-way in a peripheral surface thereof, supported by said assembly in the region of said deflection center and in nested concentric relation with respect to said bore for movement along a path concentric to said bore conjointly to establish a beam-centering field transversely of said bore; and at least one flexible cord having a portion substantially encircling said magnet and disposed in said channel-way in frictional engagement therewith, said cord being threaded through said yoke assembly to be accessible externally thereof and movable relative thereto, for effecting relative displacement of said magnets along said path to adjust the angular orientation of said magnets and thereby regulate both the direction and the strength of said beam-centering field.

3. A deflection yoke and beam-centering structure for a cathode-ray tube comprising: a yoke assembly comprising a support member, a plurality of deflection windings having a magnetic deflection center and defining with said support member a cylindrical bore, a hollow cylindrical support sleeve fitted within said bore for receiving the neck portion of a cathode-ray tube, said sleeve having apertures defining a path extending from outside said yoke assembly to the vicinity of said magnetic deflection center, and adjustable clamp means for securing a portion of said sleeve to said neck; a pair of permanent magnets, at least one of which has an annular channel-way in a peripheral surface thereof, supported in said assembly in the region of said deflection center and in nested concentric relation with respect to said bore for movement along a path concentric to said bore conjointly to establish a beam-centering field transversely of said bore; and at least one flexible cord disposed in said channel-way in frictional engagement therewith and threaded through said apertures to be accessible externally of said yoke assembly, and movable relative thereto for effecting relative displacement of said magnets along said path to adjust the angular orientation of said magnets and thereby regulate both the direction and the strength of said beam-centering field.

4. A deflection yoke and beam-centering structure for a cathode-ray tube comprising: a yoke assembly, comprising a plurality of deflection windings having a magnetic deflection center, including a cylindrical bore for receiving the neck portion of a cathode-ray tube; a first permanent magnet member, comprising a magnetic element and a non-magnetic drive wheel having an annular channel-way in a peripheral surface thereof, supported by the assembly in the region of said deflection center and in nested concentric relation with respect to said bore for movement along a path concentric to said bore; a second permanent magnet member, including a magnetic element and a non-magnetic drive wheel having an annular channel-way in a peripheral surface thereof, supported by the assembly adjacent said first permanent magnet member in the region of said deflection center and in nested concentric relation with respect to said bore, for movement along a path concentric to said bore to establish with said first permanent magnet member a beam-centering field transversely of said bore; and a pair of flexible cords respectively disposed in said channel-ways in frictional engagement therewith and threaded through said yoke assembly to be accessible externally thereof, and individually movable relative to said assembly, for effecting relative displacement of said magnet members along said path to adjust the angular orientation of said magnet members and thereby regulate both the direction and the strength of said beam-centering field.

References Cited in the file of this patent

UNITED STATES PATENTS

| | | |
|---|---|---|
| 2,418,487 | Sproul | Apr. 8, 1947 |
| 2,565,331 | Torsch | Aug. 21, 1951 |
| 2,580,606 | Schiel et al. | Jan. 1, 1952 |
| 2,646,522 | Shaw et al. | July 21, 1953 |
| 2,795,717 | Finkelstein et al. | June 11, 1957 |
| 2,801,356 | Heppner | July 30, 1957 |